D. H. MOSTELLER.
ICE CREAM SPOON.
APPLICATION FILED MAR. 11, 1914.
1,142,354.
Patented June 8, 1915.
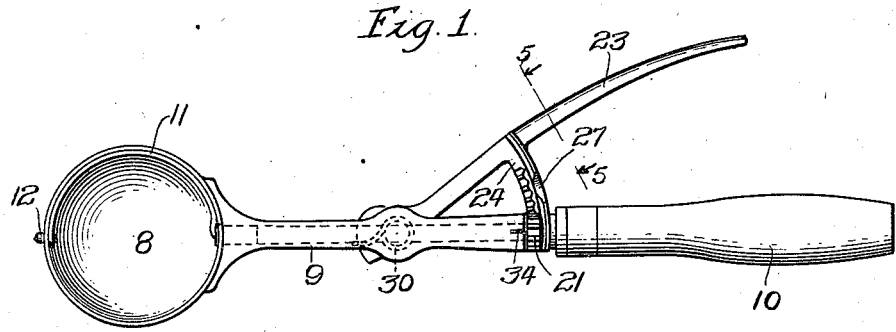
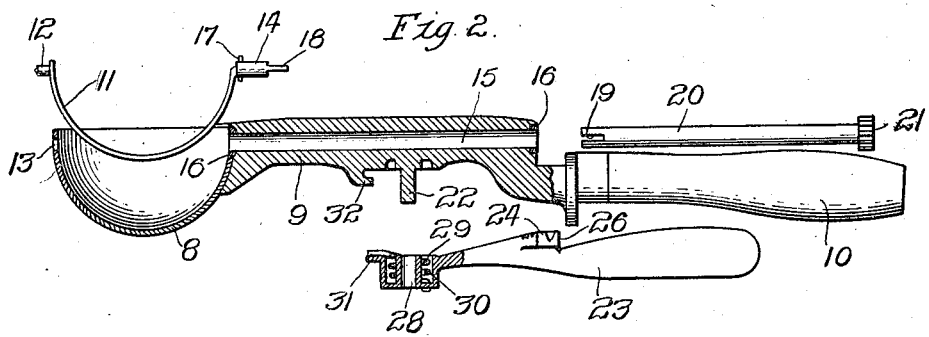
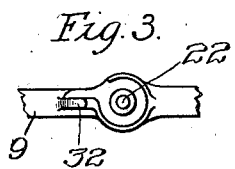 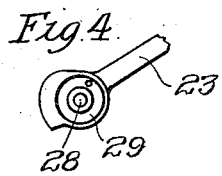 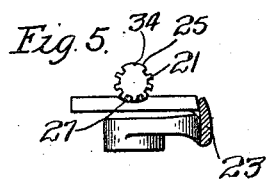
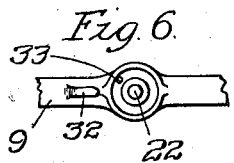 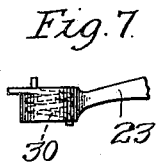
Witnesses:
Inventor:
Dosier H. Mosteller
By Banning & Banning
Atty's

UNITED STATES PATENT OFFICE.

DOSIER H. MOSTELLER, OF CHICAGO, ILLINOIS, ASSIGNOR, BY DIRECT AND MESNE ASSIGNMENTS, OF ONE-HALF TO ROBERT MALCOM, OF CHICAGO, ILLINOIS, AND ONE-HALF TO G. C. BUQUO, OF ASHEVILLE, NORTH CAROLINA.

ICE-CREAM SPOON.

1,142,354.   Specification of Letters Patent.   Patented June 8, 1915.

Application filed March 11, 1914. Serial No. 823,961.

*To all whom it may concern:*

Be it known that I, DOSIER H. MOSTELLER, a citizen of the United States, residing at Chicago, in the county of Cook and State of Illinois, have invented certain new and useful Improvements in Ice-Cream Spoons, of which the following is a specification.

This invention relates to spoons used principally for dishing out a measured quantity of ice cream, and has particular reference to the arrangement and construction of the means by which the spoon scraper is actuated, as well as numerous other coöperating features.

In the present device, I have sought to construct an ice cream spoon in which the operating parts are readily removable so as to permit of cleansing or replacement whenever necessary; to protect the operating parts as far as possible from contact with the ice cream and melted fluid with which the instrument comes into contact; to eliminate entirely the use of screws, nuts or similar fastening elements for maintaining the component parts in assembled relation; and to provide a form of construction which is simple, strong and effective, as well as inexpensive of manufacture. These and other objects will more clearly appear from a description of the invention and drawing as hereinafter set forth.

In the drawing: Figure 1 is a top or plan view of an ice cream spoon embodying my invention; Fig. 2 is a longitudinal vertical section therethrough, showing the component parts disassembled; Fig. 3 is a fragmentary view in elevation of the bottom of the shank, showing the operating handle removed; Fig. 4 is a fragmentary view in elevation of the pivotal end of the operating handle; Fig. 5 is a detail of the operating handle and rack carried thereby, taken on line 5—5 of Fig. 1; Fig. 6 is a view similar to Fig. 3, showing a modified form of shank construction; and Fig. 7 is a side elevation of the pivotal end of an operating handle, showing a form of construction adapted for use with a shank, such as illustrated in Fig. 6.

My ice cream spoon comprises a bowl 8, a shank 9 attached thereto, and a handle 10 secured to the shank for convenience in manipulating the device. Within the bowl, a scraper 11 formed preferably of spring material is operatively positioned, having a trunnion 12 at one end adapted to be journaled within a bore 13, and a stub shaft 14 at the other end, arranged to lie and revolve within a bore 15 disposed in the interior of the shank. At the extremities of the bore 15, packing rings 16 are arranged within suitable annular recesses, the ring at the bowl extremity being engaged by an annular shoulder 17 on the stub shaft 14. The bore 15 by these means is thus protected against the entrance or leakage of fluid or other substances which might interfere with the operation of the device. The stub shaft is further shaped to provide, in effect, a tongue 18 at its extremity within the bore adapted to register and lock with the grooved end 19 of a spindle 20 disposed within the bore.

As shown by the dotted lines in Fig. 1, the spindle is capable of being inserted within the bore 15 and locking with the stub shaft 14. A mutilated pinion 21 which is arranged on one end of the spindle alone lies exteriorly of the shank. Pivotally connected with the shank, as at 22, is an operating handle 23 which carries a rack member 24, the teeth of which engage with the pinion 21 to oscillate the spindle, the swinging movements of the operating handle being limited by engagement of the mutilated or uncut portion 25 of the pinion 21 with the rack 24. A flange 26 is carried by the rack member to provide a retaining wall for the pinion 21, and thus prevent endwise movement of the spindle 20, a cut-away portion 27 being arranged substantially midway between the operating ends of the rack 24 for purposes to be hereinafter explained. The pivotal end of the operating handle, as best shown in Fig. 2, is provided with a suitable bore 28 within which the pivotal member 22 may lie, an annular chamber 29 being arranged around the bore to receive therewithin a coil spring 30. An outwardly extending lip 31 is further provided on the pivotal end of the operating handle, being extended only partially around the annular chamber 29, so that when the handle is swung through a certain portion of a circle, this lip is arranged to lie within a hook-like member 32 formed on the shank. As is apparent from Fig. 4, when the handle is swung to certain positions, the lip no longer engages with the hook-like member 32, so that removal of the operating handle from the shank is then possible. The ends of the coil spring are secured one through a hole in the operating handle, and the other by lateral engagement with the body of the hook-like member on the shank, thus exerting a constant force which tends to throw the operating handle outward to the position shown in Fig. 1. In the construction illustrated in Figs. 6 and 7, one end of the spring engages with an opening 33 formed in the shank and is thus entirely concealed, instead of presenting one end in engagement with the body of the hook-like member.

In operation, the operating handle 22 may be engaged by the thumb, but preferably by the fingers, or palm of the hand, and moved inwardly as far as the mutilated pinion 21 engaging with the rack 24 will permit. The reciprocation of the rack serves to effect an oscillation of the spindle 20 and scraper 11 connected therewith so as to dislodge the contents of the bowl 8. Return movement of the parts to the initial position is accomplished by means of the spring 30, which causes the operating handle to be swung outwardly and the remaining elements to be restored to the position shown in Fig. 1. During these movements, the scraper 11 remains securely in operative position, the spindle 20 is prevented from disconnecting with the scraper and disengaging from the rack 24 by means of the flange 26, and the operating handle is pivotally locked to the shank through engagement of the lip 31 with the hook-like member 32. As before explained, the swinging movements of the operating handle 22 are limited by the uncut portion 25 of the mutilated pinion 21 engaging with the rack member 24.

When for purposes of cleansing or otherwise, it is desired to disassemble the device, the operating handle 22 is swung but half way in, so that the cut away portion of the flange is substantially in line with the axis of the spindle 20. In this position the uncut portion of the pinion 21 assumes a position such as is shown in Fig. 5, while the scraper is pointed downwardly within the bowl substantially midway between the edges thereof. The position necessary to effect a disassembling of the device may be ascertained readily by the indicating marks 34, one on the shank and the other on the uncut portion 25 of the pinion. These marks aline only when the parts have assumed the one position in which withdrawal of the spindle 20 and the pinion 21 through the flange 26 on the rack is possible. When such withdrawal has been effected, the operating handle is no longer limited as before in its outward swinging movement, but may be swung around through a much greater arc to a position where the lip 31 no longer engages with the hook-like member 32, and thus allow the operating handle to be withdrawn from pivotal connection with the shank. By inwardly pressing the end of the scraper 11 which carries the trunnion 12, and thus disengaging the same from its journal 13, the scraper may also be removed from the bowl. This operation of entirely disassembling the device is accomplished, it is to be noted, without the necessity of any tools or implements, or unscrewing or preliminary adjustment of parts. Conversely, when it is desired that the device should be reassembled, no parts which are likely to become loosened or change adjustment, and thus interfere with the operation of the instrument, require attention.

The entire device comprises but a single part which constitutes the bowl, shank, and handle, and three individual operating elements, viz., the scraper, spindle, and operating handle. Because of this construction, and because the major portion of the transmission is effectually prevented from contact with food products of all kinds, the operation of the device is exceptionally easy, and free from complication.

I claim:

1. In an ice cream spoon, the combination with a bowl and a shank, of a scraper removably positioned within the bowl, a spindle positioned within the shank for operating the scraper and removable from the shank independently of the scraper, and an operating handle removably secured to the shank, arranged both to oscillate the spindle and prevent displacement of the same, substantally as described.

2. In an ice cream spoon, the combination with a bowl and a shank, of a scraper removably positioned within the bowl, a spindle positioned within the shank for operating the scraper and removable from the shank independently of the scraper, and a single means for locking said spindle in operative position and for oscillating the same, substantially as described.

3. In an ice cream spoon, the combination with a bowl and a shank, of a member arranged upon the shank and removable therefrom only when not in operative position, a spindle removably positioned within the shank but normally locked therein by said member, and a scraper removably positioned within the bowl and operatively connected with said spindle, substantially as described.

4. The combination with an ice cream spoon embodying a bowl, a scraper removably positioned therein, a shank, and a spindle positioned within the shank for operating the scraper and removable from the shank independently of the scraper, of a pinion arranged externally of the shank upon the spindle, a rack in engagement with the pinion, means integral with the rack for preventing disengagement of the pinion therefrom, except when certain relative positions occur, and operating means for reciprocating the rack to impart oscillatory movement to the spindle and scraper, substantially as described.

5. The combination with an ice cream spoon embodying a bowl, a scraper removably positioned therein, a shank, and a spindle positioned within the shank for operating the scraper and removable from the shank independently of the scraper, of a pinion arranged externally of the shank upon the spindle, a rack in engagement with the pinion, means integral with the rack for preventing disengagement of the pinion therefrom, except when certain relative positions occur, and operating means removably secured to the shank for reciprocating the rack to impart oscillatory movement to the spindle and scraper, said operating means being maintained in locked relation with the shank, except when the spindle is withdrawn therefrom, substantially as described.

6. An ice cream spoon embodying in combination a bowl, a scraper within the bowl, a shank, a spindle within the shank removably connected with the scraper, a pinion on the spindle, a rack for operating the pinion, and a flange integral with the rack for preventing endwise movement of the spindle, and provided with a cutaway portion through which the pinion and rack may pass when alined therewith, substantially as described.

7. An ice cream spoon embodying in combination a bowl, a scraper within the bowl, a shank, a spindle within the shank removably connected with the scraper, a pinion on the spindle, a rack for operating the pinion, a flange integral with the rack for preventing endwise movement of the spindle, and provided with a cutaway portion through which the pinion and rack may pass when alined therewith, and an operating member secured to the shank for reciprocating the rack, and removable therefrom only when said spindle is withdrawn from the shank, substantially as described.

8. An ice cream spoon embodying a bowl, a scraper within the bowl, a shank, a spindle within the shank connected with the scraper, and means for oscillating the spindle, including an operating handle, and a pivotal connection between the shank and handle, said connection being maintained at all times when said handle is in operating position, and being severable only when said handle is not in operative position, substantially as described.

DOSIER H. MOSTELLER.

Witnesses:
EPHRAIM BANNING,
THOMAS A. BANNING.